United States Patent
Gulati et al.

(10) Patent No.: US 7,330,425 B1
(45) Date of Patent: Feb. 12, 2008

(54) METHOD AND APPARATUS FOR PERMANENT SUB-NETWORK CONNECTIONS IN A COMMUNICATION NETWORK

(75) Inventors: Neeraj Gulati, Cupertino, CA (US); Sarangan Sivanesan, San Jose, CA (US)

(73) Assignee: Ciena Corporation, Linthicum, MD (US)

(*) Notice: Subject to any disclaimer, the term of this patent is extended or adjusted under 35 U.S.C. 154(b) by 905 days.

(21) Appl. No.: 10/052,917

(22) Filed: Nov. 2, 2001

(51) Int. Cl.
*G06F 11/00* (2006.01)

(52) U.S. Cl. .................. 370/225; 370/217; 370/221

(58) Field of Classification Search ........... 370/217, 370/221
See application file for complete search history.

(56) References Cited

U.S. PATENT DOCUMENTS

| | | | |
|---|---|---|---|
| 5,412,652 A * | 5/1995 | Lu | 370/223 |
| 6,097,696 A * | 8/2000 | Doverspike | 370/216 |
| 6,282,170 B1 * | 8/2001 | Bentall et al. | 370/225 |
| 6,292,463 B1 * | 9/2001 | Burns et al. | 370/216 |
| 6,343,083 B1 * | 1/2002 | Mendelson et al. | 370/466 |
| 6,600,719 B1 * | 7/2003 | Chaudhuri | 370/228 |
| 2003/0026281 A1 * | 2/2003 | Limaye et al. | 370/430 |
| 2003/0086368 A1 * | 5/2003 | Limaye et al. | 370/216 |

* cited by examiner

*Primary Examiner*—Wing Chan
*Assistant Examiner*—Anthony Sol
(74) *Attorney, Agent, or Firm*—Clements Walker; Christopher L. Bernard; Tyler S. Brown

(57) ABSTRACT

Methods and apparatus implementing and using techniques for creating a permanent sub-network connection in a network of connected nodes. A route including a working path for a permanent sub-network connection is defined in the network from an ingress node to an egress node. A time out period to be associated with the permanent sub-network connection is defined. The time out period defines a time over which a failure in the permanent sub-network connection is permitted to be corrected prior to a tear down of the permanent sub-network connection. The route is provisioned. A route description is distributed to each node along the route and each node along the route is configured in accordance with the route description to provide data traffic services from the ingress node to the egress node. Methods and apparatus implementing and using techniques for deallocating resources in a network of connected nodes are also described.

18 Claims, 4 Drawing Sheets

METHOD AND APPARATUS FOR PERMANENT SUB-NETWORK CONNECTIONS IN A COMMUNICATION NETWORK

TECHNICAL FIELD

This invention relates generally to communication systems and more specifically operation, administration, maintenance and provisioning (OAM&P) of connections in a network.

BACKGROUND

Networks, both computer and telephone, support public and private users in personal and business enterprises. As the use of networks has increased over time, so has the need for more bandwidth. Fiber optic networks were developed to meet this need and transmit data (e.g., voice and data signals) at high data rates. SONET ("Synchronous Optical Network") and SDH ("Synchronous Digital Hierarchy") were developed to be standards for fiber optic transmission.

In a conventional SONET/SDH network, the nodes have little or no information about other nodes in the network. Nodes are typically add/drop multiplexors (ADM). Conventional SONET/SDH networks require a system administrator to set up connection routes between ports coupled to the nodes of the network. A system administrator may program the route in each node along the path from an ingress point to an egress point on the network. Typically, each node (switch) in the network must be manually programmed to pass information in this manner. If a failure occurs in any one of the connections, the system administrator must manually reroute the connections by reprogramming the switches. Therefore, in order to provision each of the switches in a SONET/SDH network, one or more system administrators may be required to spend days inserting all of the needed information.

SUMMARY

In one aspect, the invention provides methods and apparatus, including computer program products, implementing and using techniques for creating a permanent sub-network connection in a network of connected nodes. A route including a working path for a permanent sub-network connection is defined in the network of nodes from an ingress node to an egress node. A time out period to be associated with the permanent sub-network connection is defined. The time out period defines a time over which a failure in the permanent sub-network connection is permitted to be corrected prior to a tear down, of the permanent sub-network connection. The route is provisioned. A route description is distributed to each node along the route from the ingress node to the egress node and each node along the route is configured in accordance with the route description to provide data traffic services from the ingress node to the egress node.

Advantageous implementations can include one or more of the following features. Defining the route can include receiving an explicit route definition from a user defining the working path. Defining the route can include dynamically determining a working path including signaling nodes in the network to determine an optimal route between the ingress node and the egress node. Provisioning the route can include creating a DTL to describe the route. Distributing the route can include distributing the DTL to all other nodes along the route. Provisioning the route can include determining if a proposed route satisfies network constraints. Provisioning the route can include determining if resources are available in each node in a proposed route. Determining if resources are available can include signaling each node in the proposed route to determine if resources are available in each respective node. Defining a time out period can include determining an amount of time to wait prior to clearing resources for the route after a failure has been detected along the route. Provisioning the route can include determining if a proposed route satisfies predetermined node requirements for each node in the proposed route. The predetermined node requirements can include quality of service requirements for a given node. It can be determined if the route can be provisioned, and if not, a working path that satisfies network and node requirements can be automatically calculated. It can be determined if no route can be defined that satisfies the network and node requirement, and the route may not be provisioned.

In another aspect, the invention provides methods and apparatus, including computer program products, implementing and using techniques for deallocating resources in a permanent sub-network connection. The permanent sub-network connection defines a connection between an ingress node and an egress node in a network of connected nodes. A failure is detected in a path included in the permanent sub-network connection between an ingress and egress node. It is determined if a predetermined time out period has expired since detection of the failure. If the time out period has expired, it is determined if the failure has been corrected. If the failure has not been corrected, resources associated with the permanent sub network connection are deallocated.

Advantageous implementations can include one or more of the following features. Determining if a predetermined time out period has expired can include retrieving a time out period value associated with the failed permanent sub-network connection and initiating a timer with the time out period value. Deallocating resources can include signaling, by one or more nodes in a path forming the permanent sub-network connection between the ingress and egress nodes, to other nodes in the path instructions to tear down the path. Route information associated with the permanent sub-network connection can be stored prior to tear down such that at a time for restoring the permanent sub-network connection, no optimal routing determination is required.

In another aspect, the invention provides methods and apparatus, including computer program products, implementing and using techniques for deallocating resources in a network of connected nodes. A failure in a path in the network is detected. It is determined if the path includes a permanent subnetwork connection, and if so, for each permanent sub network connection it is determined if a predetermined time out period has expired since detection of the failure. If the time out period has expired, it is determined if the failure has been corrected. If the failure has not been corrected, resources associated with the permanent sub network connection are deallocated.

In another aspect, the invention provides methods and apparatus, including computer program products, implementing and using techniques for deallocating resources in a network of connected nodes. A failure in a path in the network is detected. Resources for all sub-network connections traversing the path are immediately cleared. A predetermined time out period is waited prior to clearing all resources for each permanent sub-network connection traversing the path.

The invention can be implemented to realize one or more of the following advantages. Connection routes can be set up automatically between ports coupled to the nodes of the network. There may be no need for a system administrator to manually program the route in each node in the network between the ingress point and the egress point. Upon failure in a connection. Routes can also be torn down and resources can be dynamically deallocated without requiring the manual reconfiguration in nodes along the path defined by the route. Routing definitions can be explicit or automatic. If a route is defined explicitly and cannot be supported, a signaling and routing protocol can automatically calculate a working path that satisfies the requirements of the route. If a route is not explicitly defined, then the signaling and routing protocol can automatically construct a route. Resources can be automatically deallocated, for example, in the event of a network failure that lasts beyond a certain, predefined period of time.

The details of one or more embodiments of the invention are set forth in the accompanying drawings and the description below. Other features, objects, and advantages of the invention will be apparent from the description and drawings, and from the claims

DESCRIPTION OF DRAWINGS

Like reference symbols in the various drawings indicate like elements.

DETAILED DESCRIPTION

Figure 1:
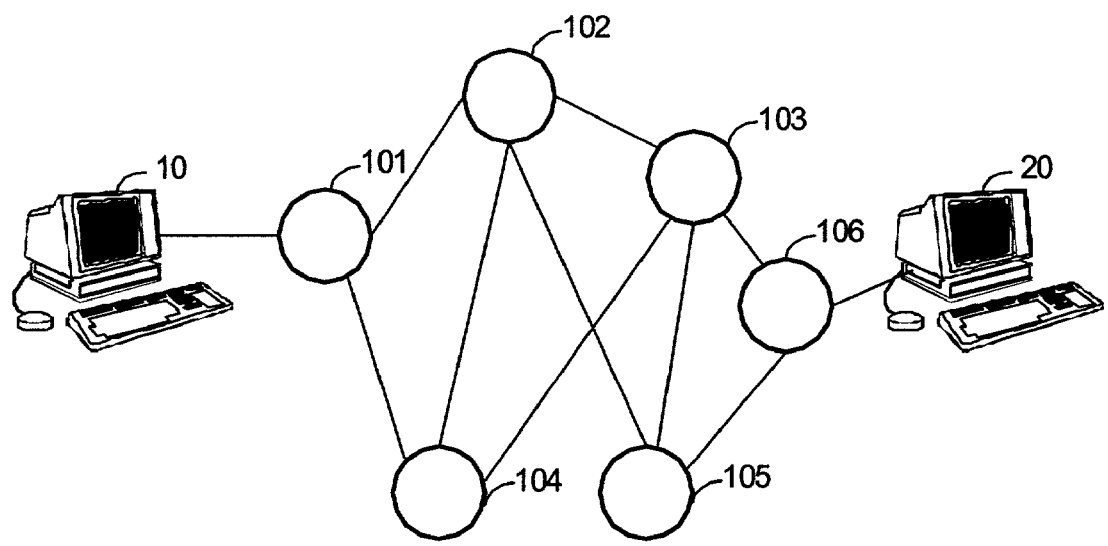
FIG. 1 shows a network of interconnected nodes.

The present invention includes methods for providing connections in a network of connected nodes. Referring to FIG. 1, network 100 includes a number of interconnected nodes 101-106, which are configured in a mesh structure, in which, each node is connected to one or more other nodes. Network user 10 is connected to network 100 through node 101, and network user 20 through node 106. One example of a node is the CoreDirector™ SONET switch manufactured by Ciena, Corporation. The connection between two nodes defines a span. Each of spans 151-159 can include one or more lines (e.g. optical fibers). When there is more than one line in a span, some of the lines can be used as working lines, while others can be used as protection lines.

The nodes in FIG. 1 may include multiple ingress ports and multiple egress ports. Each ingress port or egress port is connected to a physical line that can be an optical fiber, electric cable, an infrared wireless connection, RF connection, or microwave connection. Each physical line can include multiple channels. The multiple channels can be allocated by Time Division Multiplexing, Frequency Division Multiplexing, Code Division Multiplexing, or Dense Wavelength Division Multiplexing techniques. By using a cross-connect table, a node can switch a data stream in a channel in an ingress port to a data stream in a channel in an egress port.

The nodes in FIG. 1 can be of the form of OXCs ("Optical Cross Connects"). An OXC is an optical switch with multiple ingress ports and multiple egress ports. Each ingress port or egress port can be connected to an optical fiber that may operate in a DWDM ("Dense Wavelength Division Multiplexing") mode. An OXC can be an Optical-Electrical-Optical switch or an Optical-Optical-Optical switch. How each data stream in an ingress port is switched to a data stream in an egress port is determined by the cross-connect table. An OXC can be configured to be Fiber-Switch Capable, Lambda Switch Capable, Time-Division Multiplex Capable, or any combination thereof.

Typically each node supports both a signaling protocol and a routing protocol. For example, a node such as the CoreDirector™ SONET switch manufactured by Ciena Corporation can support an Optical Signaling and Routing Protocol ("OSRP"). Some of the routing and signaling functions of OSRP are disclosed in commonly owned and co-pending U.S. patent application Ser. No. 09/259,263 filed on Mar. 1, 1999, entitled "Routing and Signaling in a SONET Network", and Ser. No. 09/493,344 filed Jan. 28, 2000, entitled "System and Method for Calculating Protection Routes in a Network Prior to Failure." The routing protocol in OSRP is responsible for discovery of neighbors and link status, reliable distribution of routing topology information and optimal route determination. The signaling protocol provides the capability of establishing, tearing down and modifying connections across a network of nodes.

Figure 2:
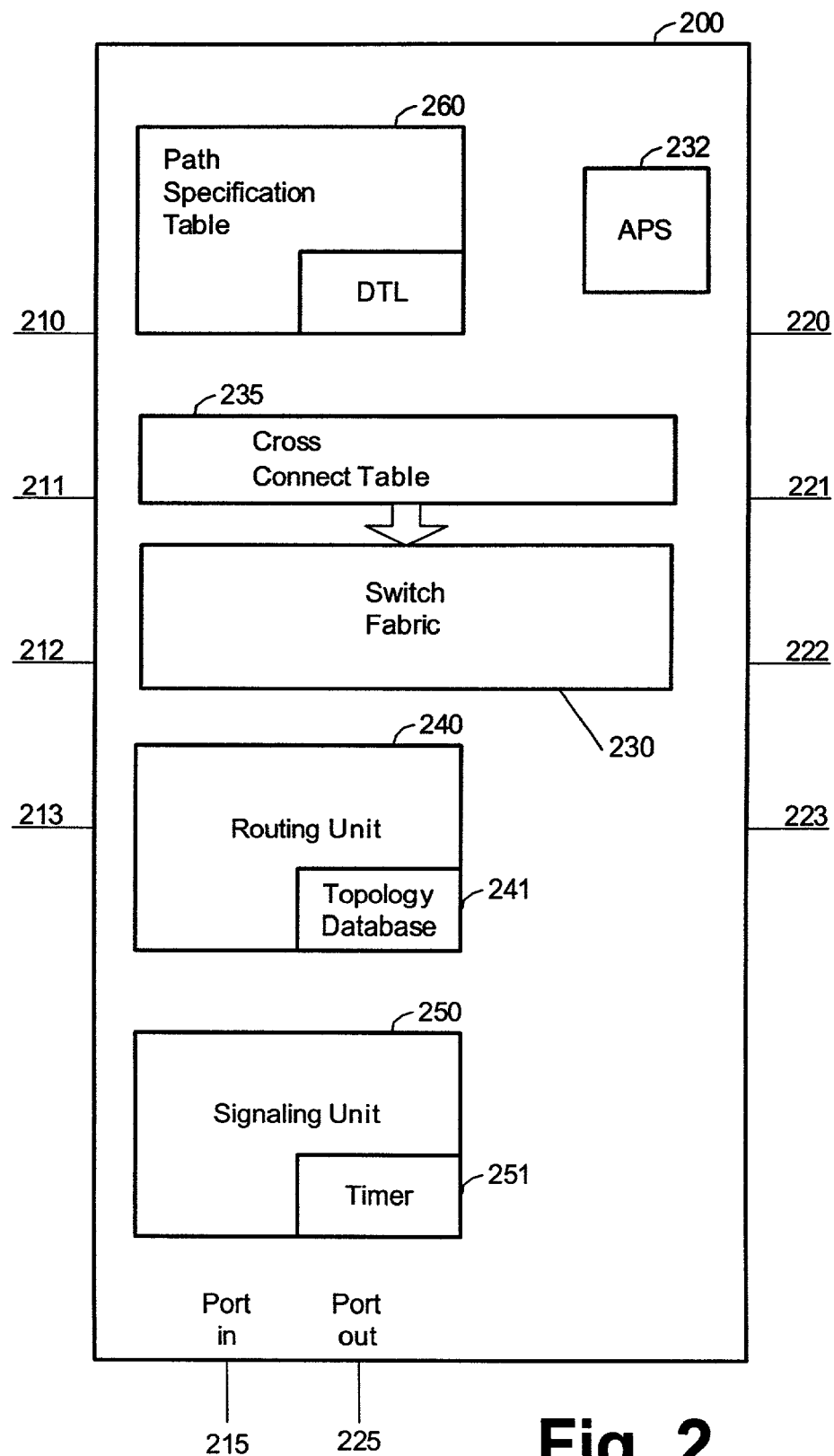
FIG. 2 shows a node of the network of FIG. 1.

FIG. 2 illustrates, in detail, a node 200 (e.g., an ingress node 101) in accordance with one aspect of the present invention. Node 200 includes ingress lines 210-213, and egress lines 220-223. Each ingress or egress line can support multiple channels. In one implementation, each ingress or egress line can support four channels c1, c2, c3, and c4. A channel in an ingress line can be logically connected to a channel in an egress line through a switch fabric 230. Switch fabric 230 is controlled by a cross-connect table 235.

Cross-connect table 235 may list multiple entries, and each entry specifies how a given channel in a given ingress line is connected to a channel in an egress line. For example, one entry in cross-connect table 235 may specify that a data stream in channel c3 in ingress port 212 be switched to a data stream in channel c1 in egress port 210. Each entry in cross-connect table 235 can be constructed using a path-specification table 260 or using a signaling protocol supported by the node 200.

Path-specification table 260 may list multiple entries, and each entry specifies how a given path connection (either actual or virtual) can be constructed from a list of nodes, ports and channels. One possible way of specifying a given path connection is to use a DTL ("Designated Transit List"). A DTL uses a sequence of Node Ids, Port IDs and optionally channel IDs to specify each node, each port and each channel that the data traffic in a given path connection traverses from beginning to end.

Path connections can be constructed statically by pre-configuring the cross-connect table in all the nodes in a given path connection. A path connection can also be constructed dynamically if node 200 supports both a routing protocol and a signaling protocol. A path between two users, between a user and a node, or between two nodes can be determined by the routing protocol. The path can be specified by a DTL. The actual path connection along the path specified by the DTL can be established by the signaling protocol.

The routing protocol and signaling protocol in node 200 may be supported by routing unit 240, signaling unit 250, and optionally port 215 and 225 for establishing out-of-band signaling and routing connections. Port 215 and 225 are optional, because in-band signaling and routing connections can be established using ingress port 210-213 and egress port 220-223 alone. Signaling unit 250 supports call processing, UNI ("User-to-Network Interface") signaling, and NNI ("Network-to-Network Interface") signaling. Routing unit 240 includes route determination functionality, topology exchange functionality, and a topology database.

APS ("Automatic Protection Switch") 232 in node 200 monitors failure conditions on each of the spans (i.e., working and protection lines) connected to node 200 and controls switching functions for data traffic on a failed line to a corresponding protection line. APS 232 may include a linear APS engine that operates to directly replace a failed working line with a protection line in the same span.

Connections

Connections through a node in the network can be temporary (e.g., on a call basis) or permanent.

Permanent connections include permanent virtual circuits ("PVCs") that define a permanent (e.g., over a considerable period of time, as differentiated to a temporary connection that is set-up and torn down at each call) allocation of resources in the network. PVCs are provisioned when ordered by the end user, not switched when a call is made. Conventionally, PVCs are provided in systems that do not support signaling. The routing for a PVC is explicitly defined by a user (e.g., system administrator).

In some conventional systems, manual cross-connects associated with the routes are configured in the cross connect table of a respective node to initialize the connection. The PVCs are said to be permanent, in that, resources associated with the route (e.g., bandwidth) cannot be re-allocated without reconfiguring each node along the path. In systems without signaling functionality, the reconfiguration includes the manual reconfiguration (e.g., by a system administrator) of the cross-connects at each node. Network resources associated with the PVCs are not dynamically reconfigurable. Accordingly, the failure, at a single point along the path from an ingress node to an egress node defining the route, will result in both unused and unavailable resources.

A sub-network connection ("SNC") defines a grouping of one or more SONET/SDH paths that pass through a node in the network. A signaling and routing protocol (e.g., OSRP) is used to route, establish and maintain one or more sub-network connections in a given node. The sub-network connections are characterized as path-based or composite. Path-based SNCs include one or more synchronous transport signals (STS-1). A composite SNC includes multiple SONET/SDH paths. Sub-network connections define a temporary (e.g., over a short period of time, where the connection is set-up and torn down at each call) allocation of resources in the network. SNCs are provisioned when a call is made. The routing for a SNC can be explicitly or automatically defined. Provisioning of SNCs is provided through a signaling and routing protocol (e.g., OSRP). Explicitly provisioned SNCs include user (e.g., system administrator)-defined routes. Automatically provisioned SNCs make use of a routing protocol (e.g., as implemented in routing unit 250) for computing an optimal route. In either case, the route information is transmitted to other nodes in the network and cross-connects associated with the routes are configured. The SNCs are said to be temporary in that, resources associated with the route (e.g., bandwidth) can be dynamically re-allocated along the path. The reconfiguration includes the clearing of the set up connection (e.g., freeing the resources at a given node). Network resources associated with the SNCs are dynamically reconfigurable. Accordingly, the failure at a single point along the path from an ingress node to an egress node defining the route will not result in unused and unavailable resources. In one implementation, a user can configure one or more of the following parameters associated with a SNC including a local line on which the SNC originates, the identification (ID) of the node on which the SNC terminates, the ID of the remote line on which the SNC terminates, a class of service, a maximum allowable delay, route setting including working and protection routes, preferred status, mesh restorability, revert configurations upon failover and reversion timers.

A permanent SNC (P-SNC) defines a hybrid of a permanent and sub-network connection. A P-SNC is characterized as being permanent in that, upon failure, the SNC is not torn down immediately and the resources associated therewith are not deallocated. However, the P-SNC can be set up and torn down with signaling. A timer (e.g., timer block 251 in signaling unit 250) is associated with each P-SNC. The timer defines an amount of time that may expire prior to the tear down of a given connection after a failure. Accordingly, a P-SNC is temporary in that, after the timer expires, the connection can be torn down and resources reallocated as appropriate. A P-SNC entry in the path specification table 260 can include a field that specifies the time out associated with tear down of the given P-SNC. Signaling unit 250 can initialize, at the detection of a failure along the P-SNC connection, a timer with a value as specified in the path specification table for a given P-SNC connection. After the time out has expired, signaling unit 250 can tear down the route and de-allocate the resources dynamically without requiring the manual reconfiguration in nodes along the path defined by the route.

Figure 3:
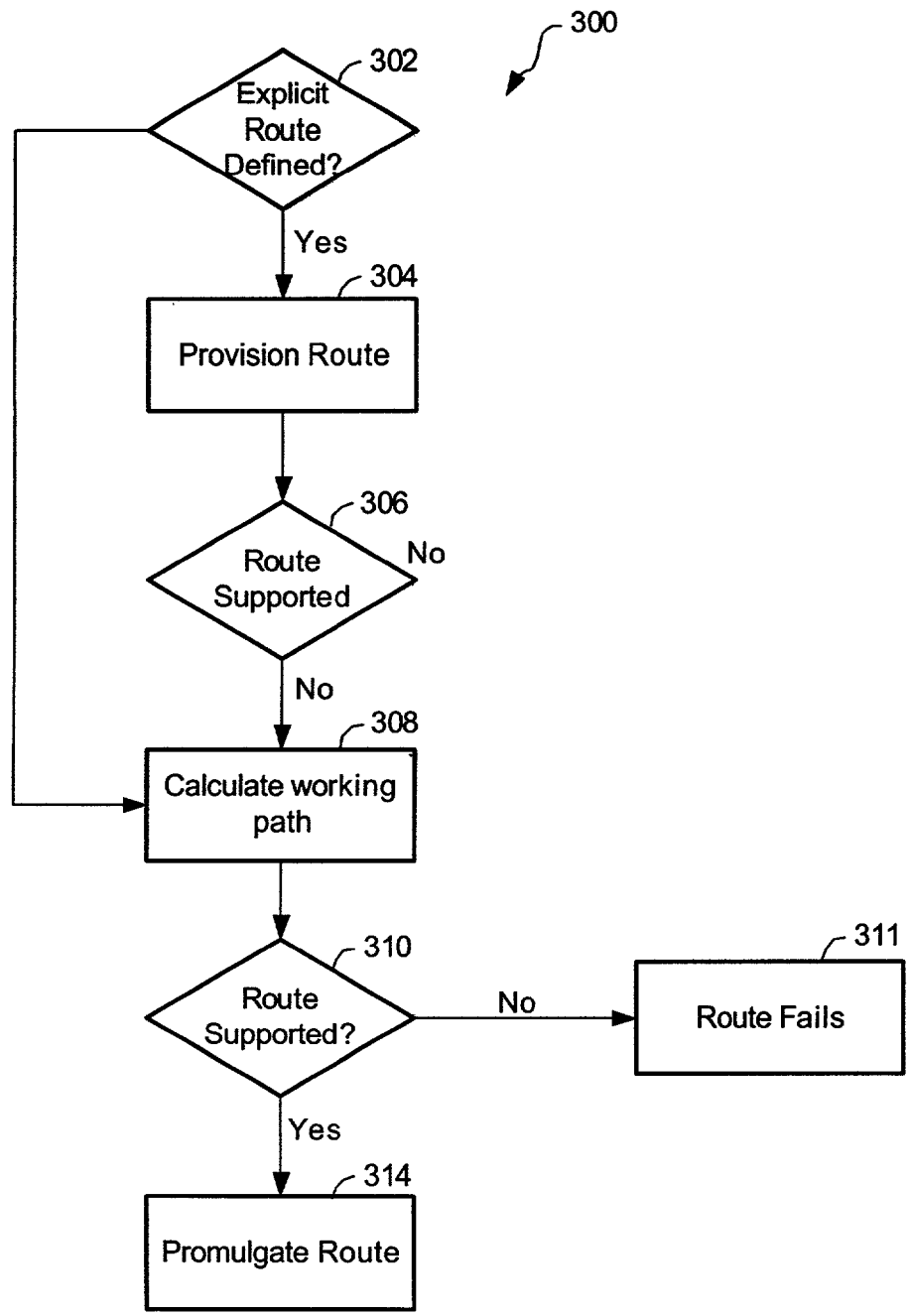
FIG. 3 is a flow diagram showing a method for creating a permanent sub-network connection.

Referring now to FIG. 3, a method for creating a P-SNC is shown and includes defining a routing for the P-SNC. The routing definition can be either explicit or automatic. A check is made to determine if a user has provided an explicit route to be associated with the P-SNC (302). If so, then the route is provisioned (304). The provisioning of the route includes checking to determine if the user-defined route satisfies certain network and node requirements such as required service class and maximum end-to-end delay. If the route cannot be supported (306) (e.g., the capacity is unavailable or if the routing constraints can not be met), then the signaling and routing protocol automatically calculates a working path that satisfies the requirements (308). If no route can be located then the provisioning fails (310).

If the user does not explicitly define the route, then signaling and routing protocol automatically constructs a route (312). The automatic construction of the route can include the creation of a DTL to describe the route. Thereafter, the route information is promulgated along the path to other nodes along the defined route (314). The promulgation of the route information can include the construction of a DTL describing the route. The DTL can be passed to other nodes along the route and stored in a path specification table associated with a given node. The DTL can then be used in configuring cross-connects in the switch fabric of the given device to support switching of data traffic along the route toward a destination (e.g., via the egress node).

Figure 4:
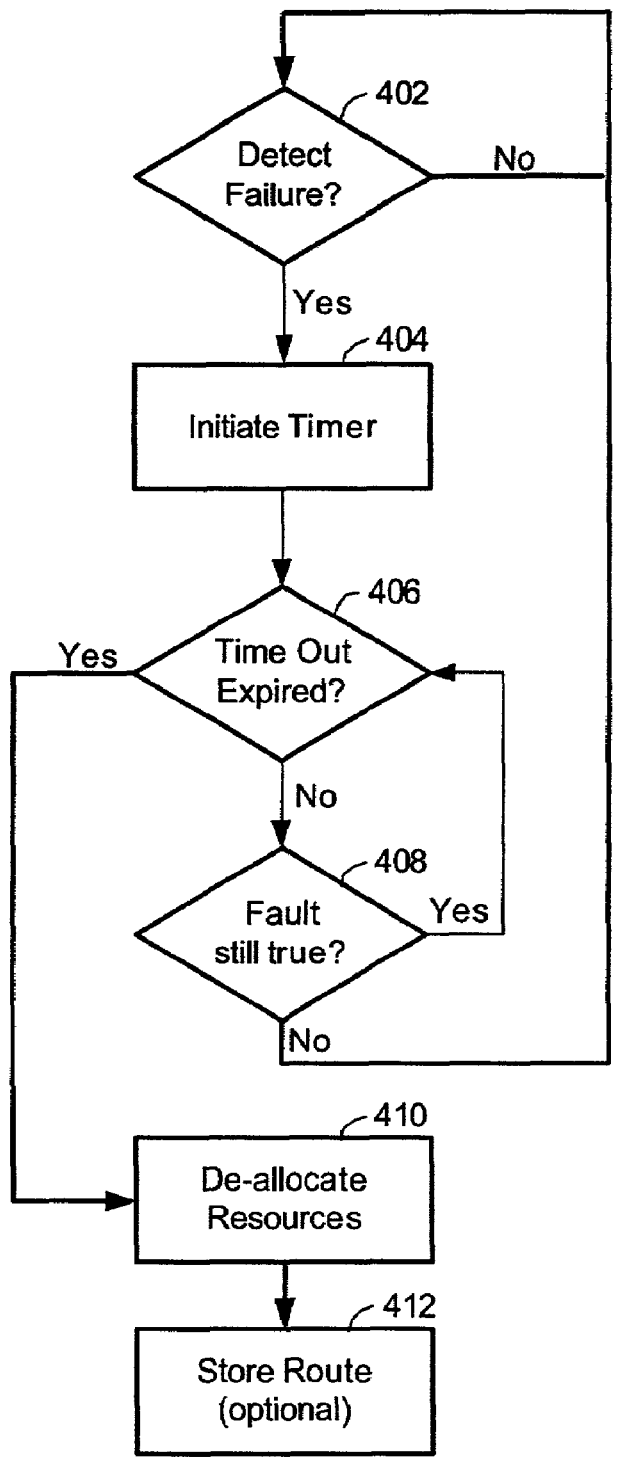
FIG. 4 is a flow diagram showing a method for deallocating resources in a network of connected nodes.

Referring now to FIG. 4, a method for deallocating resources in a P-SNC includes detecting a failure in the path between an ingress and egress nodes (402). The failure can be of the form of an explicit tear down instruction. In the case of P-SNCs, the resources can also be automatically deallocated, for example, in the event of a network failure that lasts beyond a certain, predefined period of time. In the event of a network failure, a timer associated with the P-SNC is initiated (404). The timer can be of the form of a count-up or countdown timer. A check is made to determine if a predetermined time-out period associated with the failed P-SNC has expired (406). If not, then a check is made to determine if the fault condition is still true (i.e., the failure has not been cured) (408). If the fault is still true, then the process continues at step 406. If the fault is not true (i.e., cured) then the process ends without a deallocation of resources.

If the time-out period has expired in step 406, then the resources associated with the P-SNC are deallocated (410). More specifically, the P-SNC connection is torn down including signaling each node along the route to remove the connection. For example, a signaling unit 240 in an ingress node 101 associated with the route, and upon time-out of the timer, provides a signaling message to each downstream node along the route. Each node, upon receipt of the signaling message will tear down the route (e.g., remove the DTL from the path specification table and clear the associated connection in the cross-connect table). Alternatively, and depending on where the failure occurred, interim nodes along the path will initiate timers and subsequently tear down the route for their own and other downstream nodes. In another implementation, each node along the route determines a time for tear down and does not rely on other nodes for signaling instructions. As each resource along the path is cleared, the resources are free for other connections.

In one implementation, an additional step of storing the route associated with the torn-down route is included (412). The storing of the previous route information can speed the process of provisioning the path in the future if required. A check can be made to ensure the path can be provisioned. However, assuming the network configuration has not changed, time will be saved in the provisioning of the re-allocated path.

A number of embodiments of the invention have been described. Nevertheless, it will be understood that various modifications may be made without departing from the spirit and scope of the invention. For example, embodiments of the present invention were discussed in terms of smart nodes such as CoreDirector™ SONET switches. However, alternative embodiments of the present invention can also be applied to networks constructed using other types of network nodes, such as electronic cross connects. Accordingly, other embodiments are within the scope of the following claims.

What is claimed is:

1. A method for creating a permanent sub-network connection in a network of connected nodes, the method comprising:
   discovering neighbors of each node in the network of connected nodes and link status with a signaling and routing protocol;
   distributing routing topology information and optimal route determination with the signaling and routing protocol;
   defining a route including a working path for a permanent sub-network connection in the network of nodes from an ingress node to an egress node, wherein the route is defined explicitly, automatically through the signaling and routing protocol, and in combinations thereof;
   defining a time out period to be associated with the permanent sub-network connection and initiated in response to the detection of a failure in the permanent sub-network connection, the time out period defining a time over which the failure in the permanent sub-network connection is permitted to be corrected prior to a tear down of the permanent sub-network connection;
   provisioning the route;
   distributing a route description to each node along the route from the ingress node to the egress node; and
   configuring each node along the route in accordance with the route description to provide data traffic services from the ingress node to the egress node;
   wherein the permanent sub-network connection comprises a permanent grouping of one or more paths that pass through a node in the network which is set up and torn down with the signaling and routing protocol.

2. The method of claim 1 wherein the step of defining the route includes receiving an explicit route definition from a user defining the working path.

3. The method of claim 1 wherein the step of defining the route includes dynamically determining a working path including signaling nodes in the network to determine an optimal route between the ingress node and the egress node.

4. The method of claim 1 wherein the step of provisioning the route includes creating a DTL to describe the route.

5. The method of claim 4 wherein the step of distributing the route includes distributing the DTL to all other nodes along the route.

6. The method of claim 1 wherein the step of provisioning the route includes determining if a proposed route satisfies network constraints.

7. The method of claim 1 wherein the step of provisioning the route includes determining if resources are available in each node in a proposed route.

8. The method of claim 7 wherein the step of determining if resources are available includes signaling each node in the proposed route to determine if resources are available in each respective node.

9. The method of claim 1 wherein the step of defining a time out period includes determining an amount of time to wait prior to clearing resources for the route after a failure has been detected along the route.

10. The method of claim 1 wherein the step of provisioning the route includes determining if a proposed route satisfies predetermined node requirements for each node in the proposed route.

11. The method of claim 10 wherein the predetermined node requirements include quality of service requirements for a given node.

12. The method of claim 1 further comprising:
    determining if the route can be provisioned, and if not, automatically calculating a working path that satisfies network and node requirements.

13. The method of claim 12 further comprising:
    determining if no route can be defined that satisfies the network and node requirement, and
    not provisioning the route.

14. A method for deallocating resources in a permanent sub-network connection, the permanent sub-network connection defining a connection between an ingress node and an egress node in a network of connected nodes, the method comprising:
    discovering neighbors of each node in the network of connected nodes and link status with a signaling and routing protocol;
    distributing routing topology information and optimal route determination with the signaling and routing protocol;
    detecting a failure in a path included in the permanent sub-network connection between an ingress and egress node;
    storing route information associated with the permanent sub-network connection prior to tear down such that at a time for restoring the permanent sub-network connection, no optimal routing determination is required, wherein the route information is received from the signaling and routine protocol;

initiating a predetermined time out period in response to detection of the failure;

determining if the predetermined time out period has expired since detection of the failure;

if the time out period has expired, determining if the failure has been corrected; and if the failure has not been corrected, deallocating resources associated with the permanent sub network connection;

wherein the permanent sub-network connection comprises a permanent grouping of one or more paths that pass through a node in the network which is set up and torn down with the signaling and routing protocol.

15. The method of claim 14 wherein the step of determining if a predetermined time out period has expired includes retrieving a time out period value associated with the failed permanent sub-network connection and initiating a timer with the time out period value.

16. The method of claim 14 wherein the step of deallocating resources includes signaling, by one or more nodes in a path forming the permanent sub-network connection between the ingress and egress nodes, to other nodes in the path instructions to tear down the path.

17. A method for deallocating resources in a network of connected nodes, the method comprising:

discovering neighbors of each node in the network of connected nodes and link status with a signaling and routing protocol;

distributing routing topology information and optimal route determination with the signaling and routing protocol;

detecting a failure in a path in the network using the signaling and routing protocol;

determining if the path includes a permanent sub-network connection responsive to the routing topology information, and, if so, for each permanent sub-network connection:

initiating a predetermined time out period in response to detection of the failure;

determining if the predetermined time out period has expired since detection of the failure;

if the time out period has expired, determining if the failure has been corrected; and if the failure has not been corrected, deallocating resources associated with the permanent sub-network connection;

wherein the permanent sub-network connection comprises a permanent grouping of one or more paths that pass through a node in the network which is set up and torn down with the signaling and routing protocol.

18. A method for deallocating resources in a network of connected nodes, the method comprising:

discovering neighbors of each node in the network of connected nodes and link status with a signaling and routing protocol;

distributing routing topology information and optimal route determination with the signaling and routing protocol;

detecting a failure in a path in the network using the signaling and routing protocol;

immediately clearing resources for all sub-network connections traversing the path using the signaling and routing protocol; and in response to detecting the failure, waiting a predetermined time out period prior to clearing all resources for each permanent sub-network connection traversing the path;

wherein the permanent sub-network connection comprises a permanent grouping of one or more paths that pass through a node in the network which is set up and torn down with the signaling and routing protocol.

* * * * *